(12) United States Patent
Nebeker et al.

(10) Patent No.: US 7,520,225 B2
(45) Date of Patent: Apr. 21, 2009

(54) GARAGE-INSTALLABLE, TWO-VEHICLE TURNTABLE HAVING A PAIR OF LINEARLY MOVABLE PLATFORMS WHICH DECREASE INTER-VEHICLE DISTANCE DURING ROTATION

(76) Inventors: Conrad H. Nebeker, 1750 Kershaw St., Ogden, UT (US) 84403; Michael R. Nebeker, 2600 E. Hobbs View Cir., Layton, UT (US) 84040

( * ) Notice: Subject to any disclaimer, the term of this patent is extended or adjusted under 35 U.S.C. 154(b) by 297 days.

(21) Appl. No.: 11/110,543

(22) Filed: Apr. 19, 2005

(65) Prior Publication Data

US 2006/0230973 A1 Oct. 19, 2006

(51) Int. Cl.
*B60S 13/02* (2006.01)

(52) U.S. Cl. ..................................... 104/44
(58) Field of Classification Search ............ 104/35, 104/44, 45, 46
See application file for complete search history.

(56) References Cited

U.S. PATENT DOCUMENTS

| | | | |
|---|---|---|---|
| 922,643 A | 5/1909 | Verplanck | |
| 1,379,239 A | 5/1921 | Barwicki | |
| 1,661,123 A | 2/1928 | Kocsis | |
| 1,881,033 A | 10/1932 | Smith | |
| 3,566,798 A | 3/1971 | Peitzman | |
| 4,020,767 A * | 5/1977 | Hardy | 104/35 |
| 4,172,422 A | 10/1979 | McBride | |
| 4,562,774 A | 1/1986 | Dehring | |
| 4,608,929 A | 9/1986 | Park | |
| 4,716,837 A | 1/1988 | Valencia | |
| 4,750,428 A | 6/1988 | Hyte et al. | |
| 5,086,704 A | 2/1992 | Mueller | |
| 5,538,357 A | 7/1996 | Boswell | |
| 5,755,160 A | 5/1998 | Blufordcraving | |
| 6,382,106 B1 | 5/2002 | Knight | |
| 6,672,221 B2 * | 1/2004 | Hadley | 104/35 |

* cited by examiner

*Primary Examiner*—Robert J. McCarry, Jr.
(74) *Attorney, Agent, or Firm*—Angus C. Fox, III

(57) ABSTRACT

A dual-vehicle turntable includes a subframe that incorporates a central pivot, a circular track and a rail cam; a generally circular carriage pivotably couplable to the central pivot and having a plurality of rollers angularly spaced around the periphery thereof that ride on the circular track; and a pair of linearly movable platforms mounted on the carriage, each of the platforms supporting a single vehicle and having a cam follower that tracks the rail cam. When the platforms are aligned with the opening of a garage, they are in a maximum spaced-apart relationship. However, when the carriage rotates, the platforms move towards each other, motivated by the action of the cam followers on the rail cam, thereby decreasing inter-vehicle distance and the lateral space required for the rotation of the vehicles. The platforms return to their original spacing as the carriage completes 180 degrees of rotation.

18 Claims, 8 Drawing Sheets

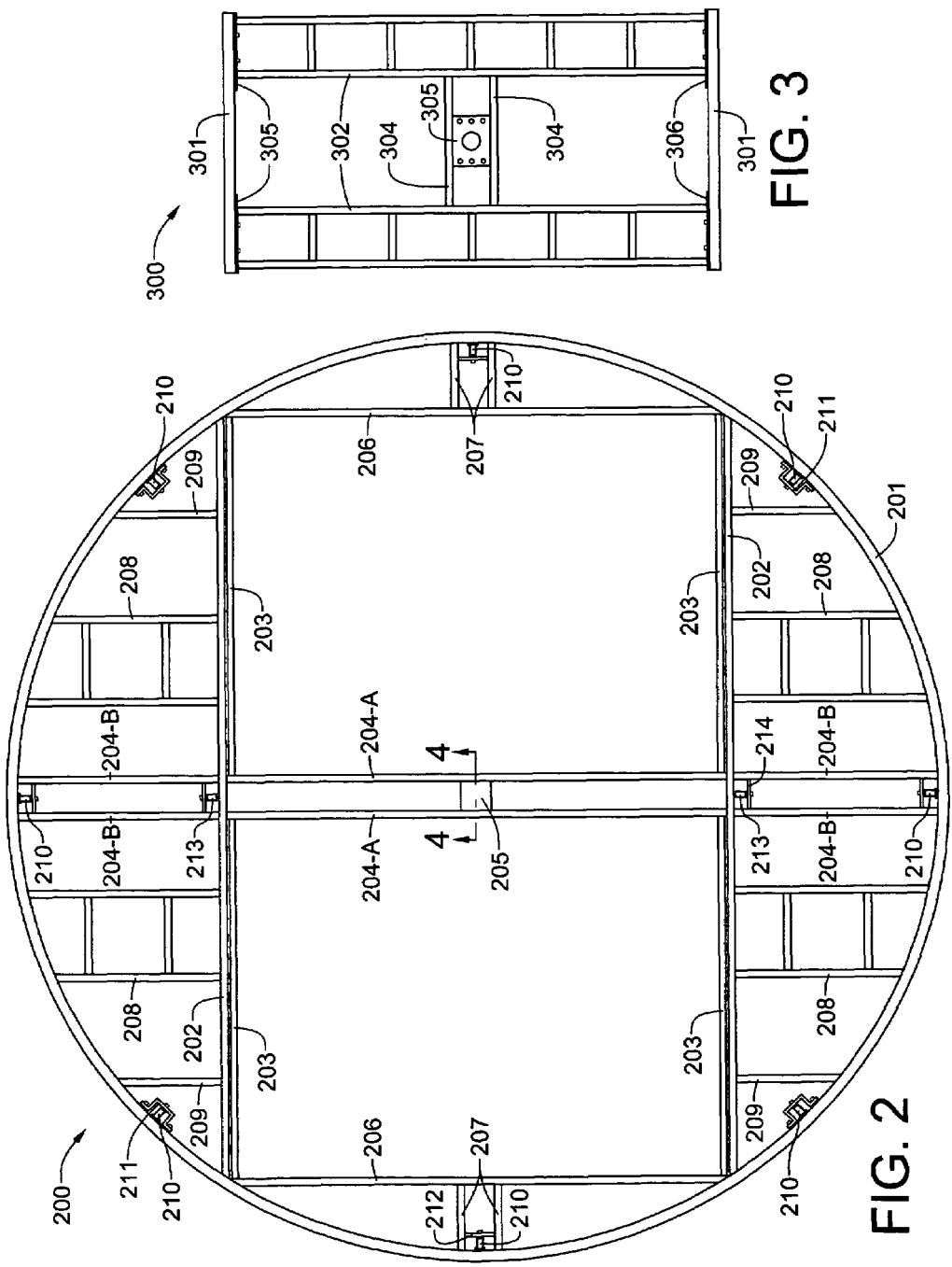

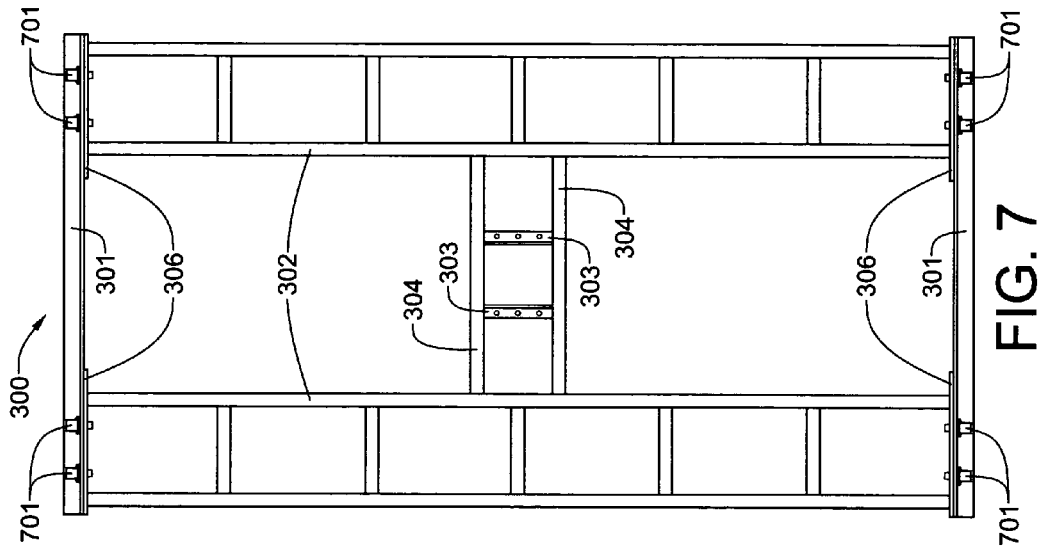
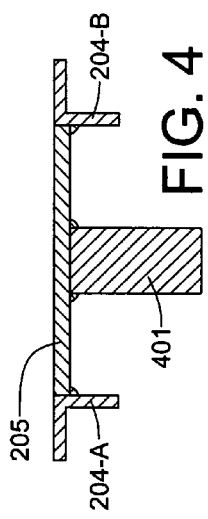
FIG. 4
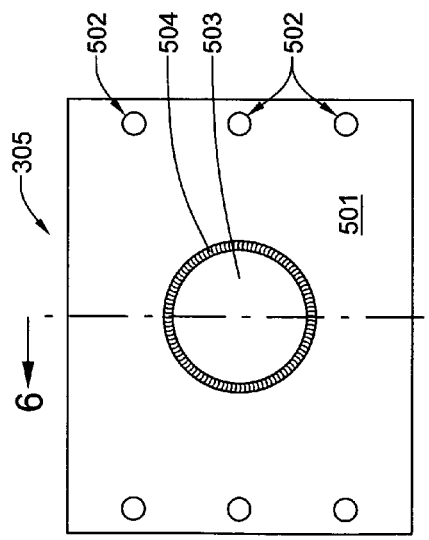
FIG. 5
FIG. 6
FIG. 7

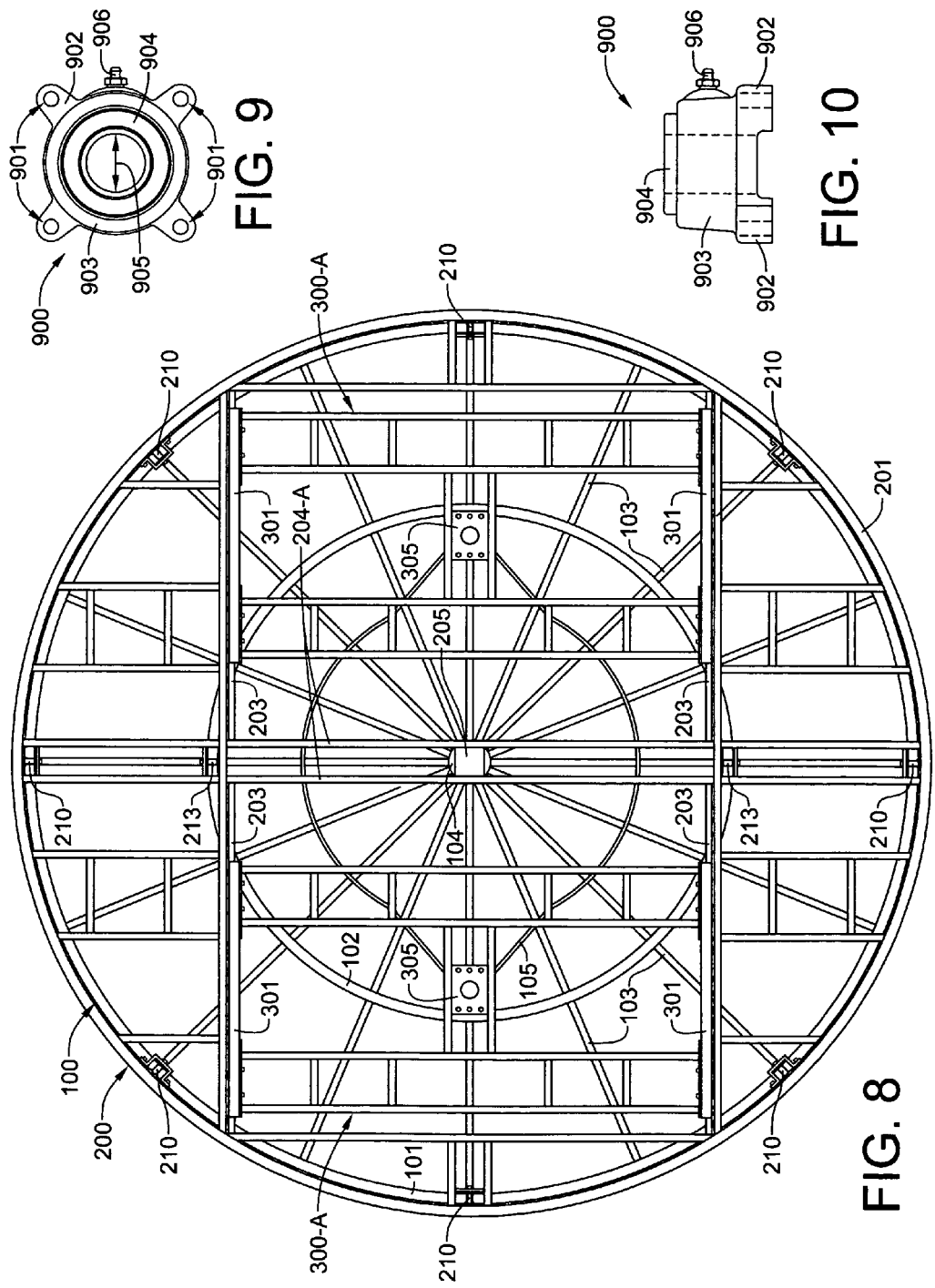

GARAGE-INSTALLABLE, TWO-VEHICLE TURNTABLE HAVING A PAIR OF LINEARLY MOVABLE PLATFORMS WHICH DECREASE INTER-VEHICLE DISTANCE DURING ROTATION

BACKGROUND OF THE INVENTION

1. Field of the Invention

The present invention relates generally to vehicle turntables useful for rotating motor vehicles about a pivot point so that they may be driven in a direction opposite that which they were driven onto the turntable. More particularly, the invention relates to a novel two vehicle, garage-installable turntable having a pair of linearly movable platforms which decrease the inter-vehicle distance during rotation, thereby permitting its use in a garage of reduced size.

2. Description of the Prior Art

Although it is nearly always safer and more convenient to drive a vehicle forward than to drive it in reverse looking over one's shoulder, in many instances, this is not possible. As land becomes more expensive in cities and heavily populated urban areas, driveways sufficiently wide for a vehicle to make an unbroken U-turn, so that it may drive in a forward direction into the street, are becoming increasingly scarce. It is also well known that, as individuals age, their spatial judgement degrades. This problem is compounded by the inability of many older adults to fully turn their heads. Thus, backing out of a garage is potentially hazardous for the vehicle, the garage and any bystanders. Although it would be highly advantageous to be able to drive forward out of a garage and into the adjacent street, this would require either a garage having front and rear doors (not even an option for garages in most residential areas) or backing into the garage (even more dangerous than backing out of the garage). Still another alternative would be to rotate the vehicle 180 degrees on a turntable while it is in the garage, so that it may driven out in a forward direction.

Motor vehicle turntables are nearly as old as the automobile. One of the earliest vehicle turntables, fabricated entirely of metal, and adapted for use in warehouses, garages, factories and similar facilities, is disclosed in U.S. Pat. No. 922,643 to H. M. Verplanck. A geared vehicle turntable for use in small private garages is disclosed in U.S. Pat. No. 1,379,239 to John Barwicki. A vehicle turntable, which functions as an anti-theft device by locking a vehicle in a garage in a transverse position, is disclosed in U.S. Pat. No. 1,661,123 to L. B. Kocsis. A vehicle turntable which uses dynamometer-type rollers to rotate the turntable using power supplied via the wheels of a vehicle, is disclosed in U.S. Pat. No. 1,881,033 to George A. Smith. A gear-driven vehicle turntable which rides on large ball bearings trapped between circular grooves in the turntable and the mounting base is disclosed in U.S. Pat. No. 3,566,798 to Herbert G. Peitzman. A vehicle turntable operated by the weight distribution of the vehicle is disclosed in U.S. Pat. No. 4,562,774 to Alexander Dehring. A turntable equipped with position detectors for small, medium and large automobiles is disclosed in U.S. Pat. No. 4,172,422 to Peter B. McBride. A vehicle turntable employing an automobile-mounted transmitter and a turntable-mounted receiver, and which can only be operated when the transmitter and receiver are vertically aligned, is disclosed in U.S. Pat. No. 4,608,929 to Kap Y. Park. A portable, low-profile vehicle turntable for placement on a driveway is disclosed in U.S. Pat. No. 4,716,837 to Alfred E. Valencia. A vehicle fluid-floatable turntable, that tips about a central axis to inhibit turning while loading, is disclosed in U.S. Pat. No. 4,750,428 to Charles A. Hyte, et al. A vehicle turntable, installable within a cylindrical pit in a driveway and having a friction chain drive system, is disclosed in U.S. Pat. No. 5,086,704 to Wieland R. Mueller, et al. A vehicle turntable mounted atop a lift is disclosed in U.S. Pat. No. 5,538,357 to Wallace E. Boswell. A vehicle turntable, adapted for installation in a garage and having a removable manhole cover in the rotating surface of the platform for maintenance of the components below the platform, is disclosed in U.S. Pat. No. 5,755,160 to Charles N. Blufordcraving. A vehicle turntable, that can be assembled without any welding of components, is disclosed in U.S. Pat. No. 6,382,106 B1 to Elijah Knight.

Although, as can be seen from the cited prior art, there are many examples of turntables which are designed to permit the repositioning of a vehicle on a driveway, these prior turntables require extensive installation in the driveway itself, where they are subjected to the elements, the weather, as well as trespassers and vandals. However, mounting a turntable in the driveway solves only half the problem, as one must still back up the vehicle out of the garage and onto the turntable.

Although a vehicle turntable installed within a garage would appear to be most advantageous, most garages in this country typically house vehicles in pairs. Thus, any vehicle turntable installed within a garage would have to be designed to rotate a pair of vehicles simultaneously, as there would be insufficient space to rotate a single vehicle at a time if two vehicles in the garage are positioned several feet apart. As there needs to be at least three feet of space between vehicles parked side-by-side in a garage to prevent doors from hitting the adjacent vehicle and to provide convenient access to the interior of the vehicle, such a vehicle turntable would require a garage that is much larger than a standard double-car garage.

What is needed is a vehicle turntable, adapted for installation in a garage, that reduces the diameter of rotation for a pair of vehicles so that the garage which houses the turntable may be reduced in size.

SUMMARY OF THE INVENTION

A dual vehicle turntable, adapted for installation in a double garage, incorporates a pair of linearly movable platforms which decrease inter-vehicle distance during rotation, thereby permitting its use in a garage of reduced size, having a pair of parallel entrance/exit paths, one for each vehicle, and includes a generally circular main frame rotatable about a central axis. The main frame is supported by a central bearing and by a plurality of rollers that are attached to the outer periphery of the main frame, generally equi-angularly spaced around the central axis, rotatable about axes which pass through the central axis, and ride on a circular track having as its center, the central axis. A pair of generally rectangular platforms are mounted on the main frame, such that they move in opposition to one another, and are always equidistant from the central axis. A plurality of rollers are used to minimize friction of movement between the platforms and the main frame. A rail formed in a loop, with a generally circular main pattern concentric with the central axis, and having two lobes 180 degrees apart, functions as a cam. Each platform is equipped with a cam follower that tracks the rail cam. The lobes of the rail cam are oriented so that when the rectangular platforms are aligned with the pair of parallel entrance/exit paths, each platform is positioned a maximum distance from the central axis. As the main frame is rotated about the central axis, each of the platforms tracks initially moves toward the central axis as the cam follower tracks the rail cam. A minimum distance from the central axis is maintained until the main frame begins to approach the 180 degree rotation mark, at which time, the rectangular platforms, once again, move apart from one another. The rectangular platforms move with respect to one another much like the pistons in a horizontally-opposed "boxer-type" internal combustion engine. That is to say that whenever the rectangular platforms move, they both move at the same time, but in opposite directions. The moveable rectangular platforms act to move a pair of vehicles parked on the turntable closer together as the turntable rotates, thereby permitting the vehicles to be rotated in less space, which permits the construction of a garage of smaller size that would be necessary if the vehicles retained their spacing as the turntable rotates. Both the main frame and the rectangular platforms are covered with laminar plates, which provide a level surface onto which a pair of vehicles may be driven. For a preferred embodiment of the invention, the turntable is built within a recess so that the top surface of the turntable is even with the floor of the garage. The turntable is preferably rotated with a remotely controlled electric motor that is coupled to the main frame with belts, gears, chain and sprockets, or other similar means.

DESCRIPTION OF THE DRAWINGS

FIG. 2 is a top plan view of the carriage;

FIG. 3 is a top plan view of a moveable platform;

FIG. 4 is a cross-sectional view of the central pivot plate and angle beams of the moveable platform, taken through section line 4-4 of FIG. 2;

FIG. 5 is an enlarged top plan view of a cam follower and pivot assembly;

FIG. 6 is a partial cross-sectional view of of the cam follower and pivot assembly, taken through section line 6-6 of FIG. 5;

FIG. 7 is an enlarged bottom plan view of a moveable platform;

FIG. 8 is a top plan view of the carriage having a pair of moveable platforms installed thereon, all of which is rotatably mounted atop the subframe;

FIG. 9 is a top plan view of flange bearing used to couple the carriage to the subframe;

FIG. 10 is a side elevational view of the flange bearing of FIG. 9;

DETAILED DESCRIPTION OF THE INVENTION

The dual vehicle turntable of the present invention is designed for installation in a double garage. For new construction, it may be installed within a generally circular recessin the garage floor. However, as its total height around the circumferential edges is only about 100 milimeters (4 inches), it may also be installed in relief on the garage floor itself, so that both vehicles will climb up stationary ramps (not shown) installed adjacent the circumferentail edge of the turntable. For small and intermediate size vehicles, the diameter of the turntable is about 22 feet. For larger vehicles and full-size pickup trucks, the diameter is about 24 feet. The invention and its method of manufacture of a 22-foot-diameter turntable will now be described in detail with reference to the attached drawing FIGS. 1 through 10. Fabrication of a 24-foot-diameter turntable is similar, with the structural components being strengthened commensurate with the expected increased load. Although an attempt has been made to ensure that the drawings are approximately to scale, it should be understood that they are meant to be merely illustrative.

Figure 1:
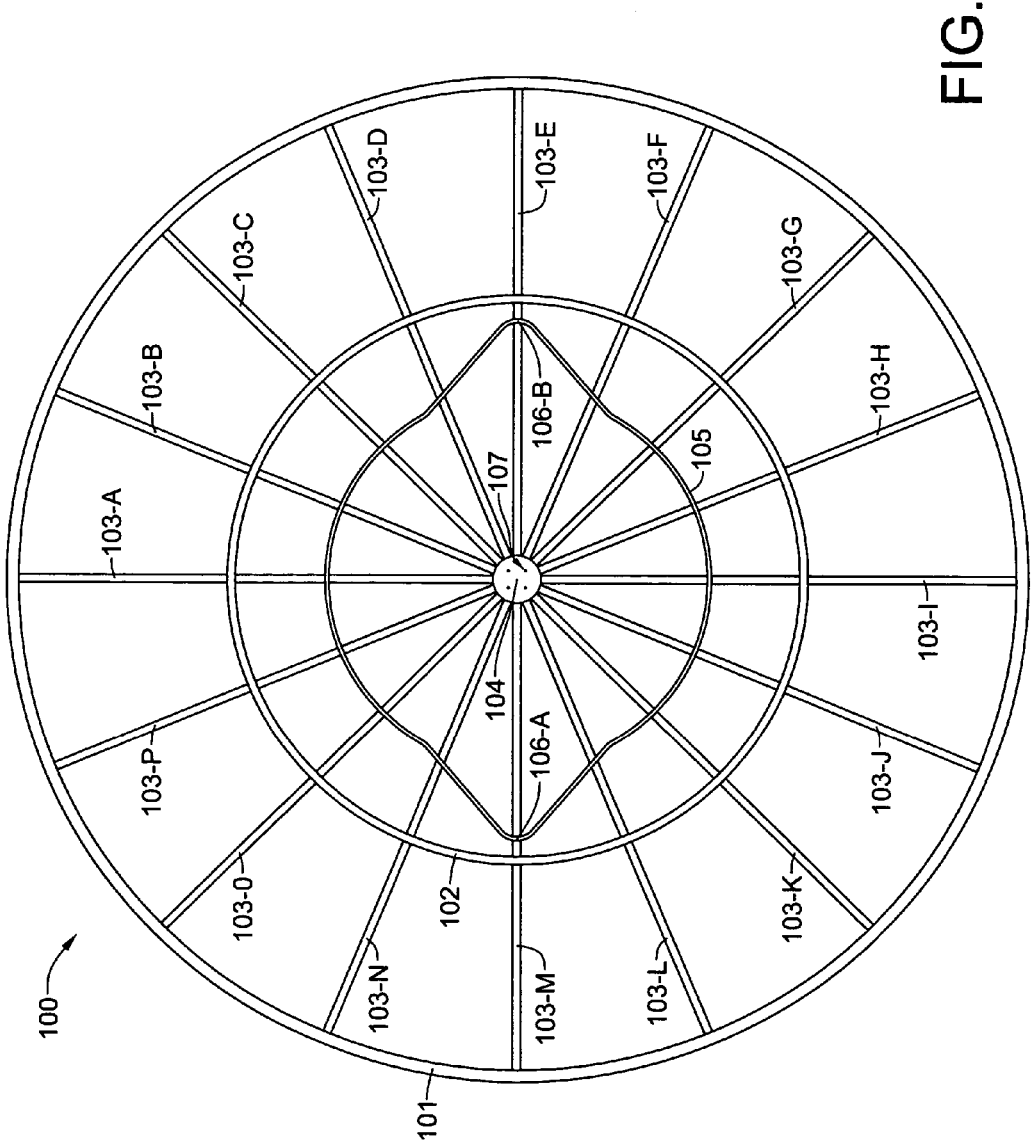
FIG. 1 is a top plan view of the sub frame.

Referring now to FIG. 1, a generally circular subframe 100 is fabricated from outer and inner concentric rings 101 and 102, respectively. A currently Each ring 101 or 102 is made by rolling a length of 3 inch×¾" steel stock on its edge and preferably welding the ends together. The concentric rings 101 and 102 are interconnected by sixteen radial spokes 103A-103P, each of which is fabricated from 2 inch×¼ inch or 1-½ inch×¼ inch steel stock. Each of the sixteen spokes 103, generally, is welded or bolted to each of the concentric rings 101 and 102 and to a 12-inch diameter ½ inch thick central collector plate 104. A dual-lobe rail cam 105 fabricated from flat stock 1-½ inches in height and ¾ inch thick is welded to each of the spokes inside the inner ring 102. For a preferred embodiment of the invention, the rail cam 105 is both bilaterally and quadrilaterally symmetrical about perpendicularly intersecting vertical planes, one plane passing through the apex of each lobe 106-A and 106-B, the other passing through the center of the collector plate 104. It will be noted that the collector plate 104 is equipped with four bolt holes 107. A flange bearing, shown in FIGS. 9 and 10, will be bolted to the collector plate 104 and will provide a central pivot axis.

Referring now to FIG. 2, a generally circular carriage 200 is fabricated with the following components: a circular hoop 201 is formed by rolling 3 inch×3 inch×angle stock having a wall thickness of ⅜ inch into a circular shape and welding the ends together. Alternatively, the circular hoop 201 may be formed by rolling one 3 inch×⅜ inch stock piece on its edge and rolling another 3 inch×⅜ inch stock piece to form a cylindrical band and then welding the two pieces together to form a hoop of L-shaped cross section. Two identical 2 inch×2 inch square tube beams 202 having a wall thickness of ¼ inch are welded at each end to the circular hoop 201 provide parallel track mounts. A pair of 1-½ inch×1-½ inch angle stock pieces 203, having a wall thickness of ⅜ inch, are welded to each of the square tube beams 202 in an ⌊, rather than a ⌈, configuration. The angle stock pieces 203 provide the tracks for the moveable platforms which will be subsequently installed. A pair of 2 inch×2 inch central angle beams 204, having a wall thickness of ⅜ inch, are perpendicular to the square tube beams 202, and extend from one side of the circular hoop 201 to the other. It will be noted that the square tube beams 202 are continuous, while the central angle beams 204 are discontinuous, having an inner portion 204-A and outer portions 204-B. They are mounted back-to-back, with the flat portions on top and facing away from one another, as shown in FIG. 4. An 8 inch×8 inch×½ inch thick central pivot plate 205 is welded to both central angle beams 204-A and 204-B, with its upper surface level with the upper surfaces of the flat portions of the central angle beams 204-A and 204-B. A pair of lateral angle beams 206, fabricated from the same material as the central angle beams (204, generally), are welded to the circular hoop 201 at both ends thereof. It will be noted that the lateral angle beams 206 are parallel to the central angle beams 204, and attach to the circular hoop 201 near the attachment points of the square tube beams 202. They are installed with the flat portions on top and facing one another. A pair of 2 inch×2 inch square tube bracing beams 207, having a wall thickness of 3/16 inch interconnect the circular hoop 201 and the lateral angle eams 206. Ladder structures 208, also fabricated entirely from 2 inch×2 inch, 3/16 inch wall square tubing interconnect the circular hoop 201 and the square tube beams 202. The ladder structures 208 are positioned where the wheels of a vehicle nearest the center of the garage are expected to pass when the vehicles are driven onto and off the turntable. Additional square tube supports 209 handle the load from the other pair of wheels. Eight, 2-½ diameter, flanged ball-bearing roller assemblies 210 are bolted between the vertical portion of the circular hoop 201 and a support bracket 211 or 212. For a preferred embodiment of the invention, these flanged ball-bearing roller assemblies 210 are procured from Osborn International, which calls them Flanged Load Runners®, with a part number FLR-2 ½. These roller assemblies 210 ride on the outer concentric ring 101 of the subframe 100 shown in FIG. 1. Two non-flanged ball-bearing roller assemblies 213, which are bolted between a square tube beam 202 and a support bracket 213. These two roller assemblies 213, which ride on the inner concentric ring 102 of the subframe 100, are also procured from Osborn Internation, which calls them Plain Load Runners®, with a part number PLRY-2 ½.

Referring now to FIG. 3, a moveable platform 300 is fabricated from a pair of ladder members 302, each of which is fabricated entirely from 2 inch×2 inch square tubing having a wall thickness of 3/16 inch. The ladder members 302 are interconnected by a pair of square tube interconnects 304 made from 2 inch×2 inch square tubing having a wall thickness of ¼ inch. A cam follower and pivot assembly 305 is bolted to the moveable platform 300 between the square tube interconnects 304. A pair of angle brakets (not shown) bridge the gap between the two square tue interconnects 304, and provide a mounting base for the cam follower and pivot assembly 305. Each end of a ladder member 302 is welded to a 2 inch×⅝ inch reinforcement bar 306, which is, in turn, welded to a 3 inch×2 inch angle beam 301, which has a wall thickness of ¼ inch. It will be noted that the wide portion of the angle beam 301 is horizontal and the narrow portion thereof faces down.

Referring now to FIG. 4, this cross-sectional view shows a solid cylindrical steel shaft 401 that has been welded to the lower surface of the central pivot plate 205. It will be noted that opposite sides of the central pivot plate 205 are welded to central angle beams 204-A and 204-B.

Referring now to FIG. 5, the top of the the cam follower and pivot assembly 305 is shown in an enlarged view. The cam follower and pivot assembly 305 comprises an upper ½ inch thick plate 501 with six holes 502 therein, which permit the cam follower and pivot assembly 305 to be bolted to a moveable platform 300. A cylindrical bearing housing 503 is welded into the center of the upper plate 501 with a circular weldment 504.

Referring now to FIG. 6, this partial cross-sectional view of the cam follower and pivot assembly 305 shows a pair of flanged cam follower ball-bearing roller assemblies 601, which for a preferred embodiment of the invention, are Osborn part numbers FLR 2 ½-1. Although not a part of the cam follower and pivot assembly 305, the rail cam 105 is also shown in cross-sectional format. Each of the flanged cam follower ball-bearing roller assemblies 601 has a threaded shaft 602 that is anchored in a steel plate 603 that is rigidly attached to a steel shaft 604 that rides in a ball bearing assembly 605 that is installed within the bearing housing 503 that is welded to the upper plate 501. The ball bearing assembly 605 permits the steel plate 603 to rotate so that a plane passing through the axes of the roller assemblies 601 is always about perpendicular to the vertical surfaces of the rail cam 105. It will be noted that the rail cam 105 is welded to the radial spokes 103 of the subframe 100 with weldments 606.

Referring now to FIG. 7, a moveable platform 300 has been turned upside down. The angle brackets 303, to which the cam follower and pivot assembly 305 bolts, are visible in this view, as are eight 1-½ inch flanged ball-bearing roller assemblies 701 (Osborn part number FLR-1 ½) that are bolted through an angle beam 301 and a reinforcement bar 306. When the moveable platform 300 is installed on the carriage 200, the roller assemblies 701 ride on the upper surface of the horizontal portion of an angle stock pieces 203. Two moveable platforms 300 are used for each carriage 200.

Referring now to FIG. 8, two moveable platforms 300 have been installed on the carriage 200, and the carriage 200 has been installed on the subframe 100. The left movable platform will be identified as 300-A, while the right movable platform will be identified as 300-B. It will be noted that each cam follower and pivot assembly 305 has been positioned so that the roller assemblies 601 straddle the rail cam 105. It will also be noted that the eight flanged ball-bearing roller assemblies 210 are positioned above the outer concentric ring 101 and the two non-flanged ball-bearing roller assemblies 213 are positioned above the inner concentric ring 102.

Referring now to FIGS. 9 and 10, a double-row tapered roller flange bearing 900 is shown. For a preferred embodiment of the invention, this flange bearing 900 is Dodge® part number 023103, procured from the Rockwell Automation Company. The flange bearing 900 bolts to the central collector plate 104 of the subframe 100 through bolt holes 901 in in the mounting ears 902. The flange bearing 900 has a stationary outer portion 903, of which the mounting ears 902 are a part. It also has a rotatable inner part 904 with a cylindrical aperture 905. The cylindrical steel shaft 401 (see FIG. 4) fits into the cylindrical aperture 905 of the flange bearing 900, which handles both vertical thrust loads and a share of the side loads of the circular carriage 200, as it rotates about the subframe 100. A Zerk grease fitting 906 facilitates lubrication of the flange bearing 900.

Figure 11:
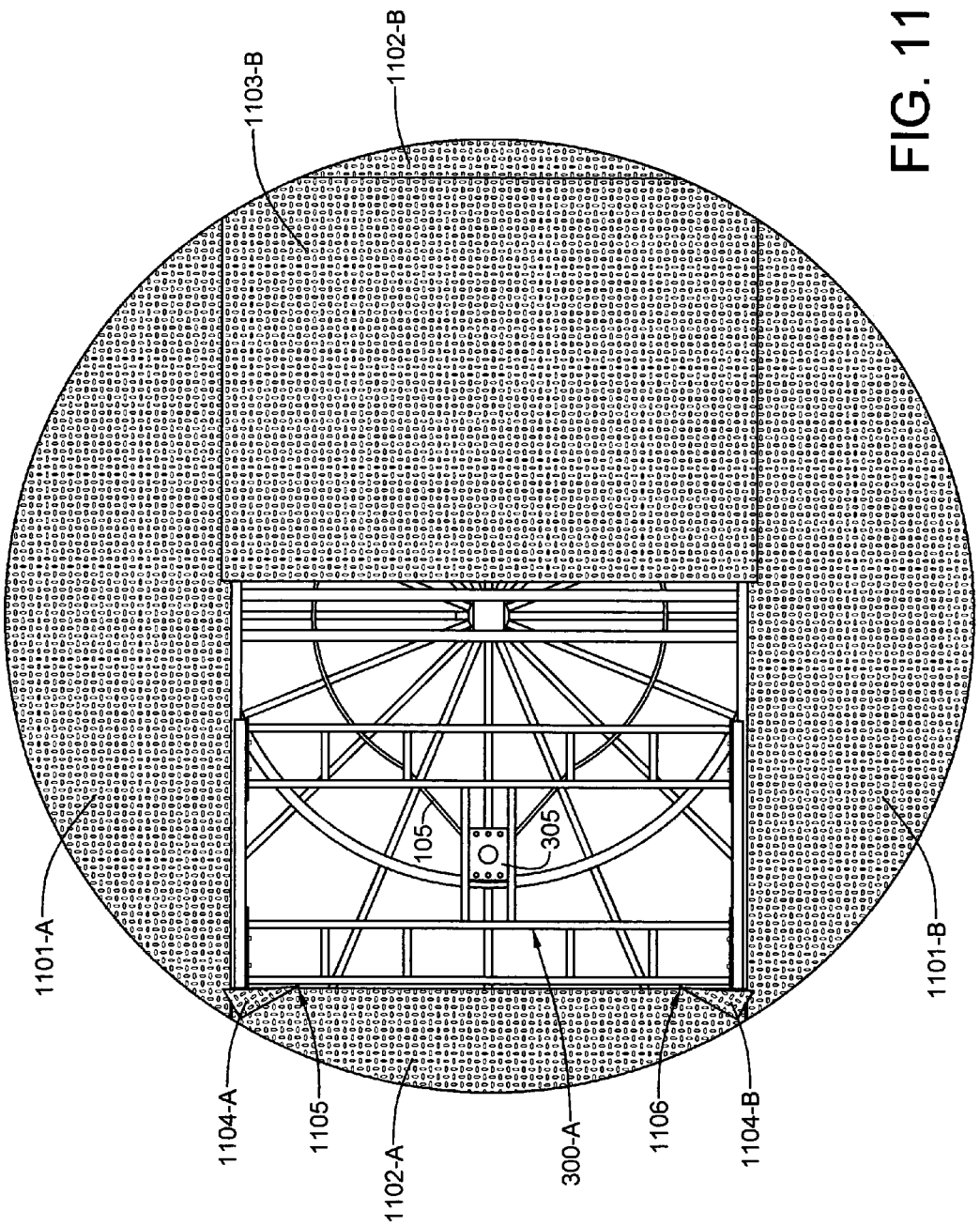
FIG. 11 is a top plan view of the assembly of FIG. 8 after it has been partially covered with metal decking plates.

Referring now to FIG. 11, the assembly of FIG. 8 has been partially covered with sheet metal decking. Panels 1101-A, 1101-B, 1102-A and 1102-B are affixed to the carriage with removable screws (now shown), while panel 1103-B is affixed to the right movable platform 300-B, also with removable screws. Another panel 1103-A, similar to similar panel 1103-B, will be subsequently affixed to the left movable platform 300-A. The small, triangularly-shaped panels 1104-A and 1104-B are pivotably attached to the carriage 200 at points 1105 and 1106, respectively. As the movable platforms 300-A and 300-B move toward the center of the carriage 200, each of the small panels 1104-A or 1104-B is rotated by a series-connected cable and spring (not shown) that couple the small panel 1104-A or 1104-B to the nearest movable platform 300, so that they cover an opening that results from the trimmed corners on panels 1103-A and 1103-B. On the 24-foot-diameter turntable, the small panels 1104-A and 1104-B are not necessary, as panels 1103-A and 1103-B may be fully rectangular.

Figure 12:
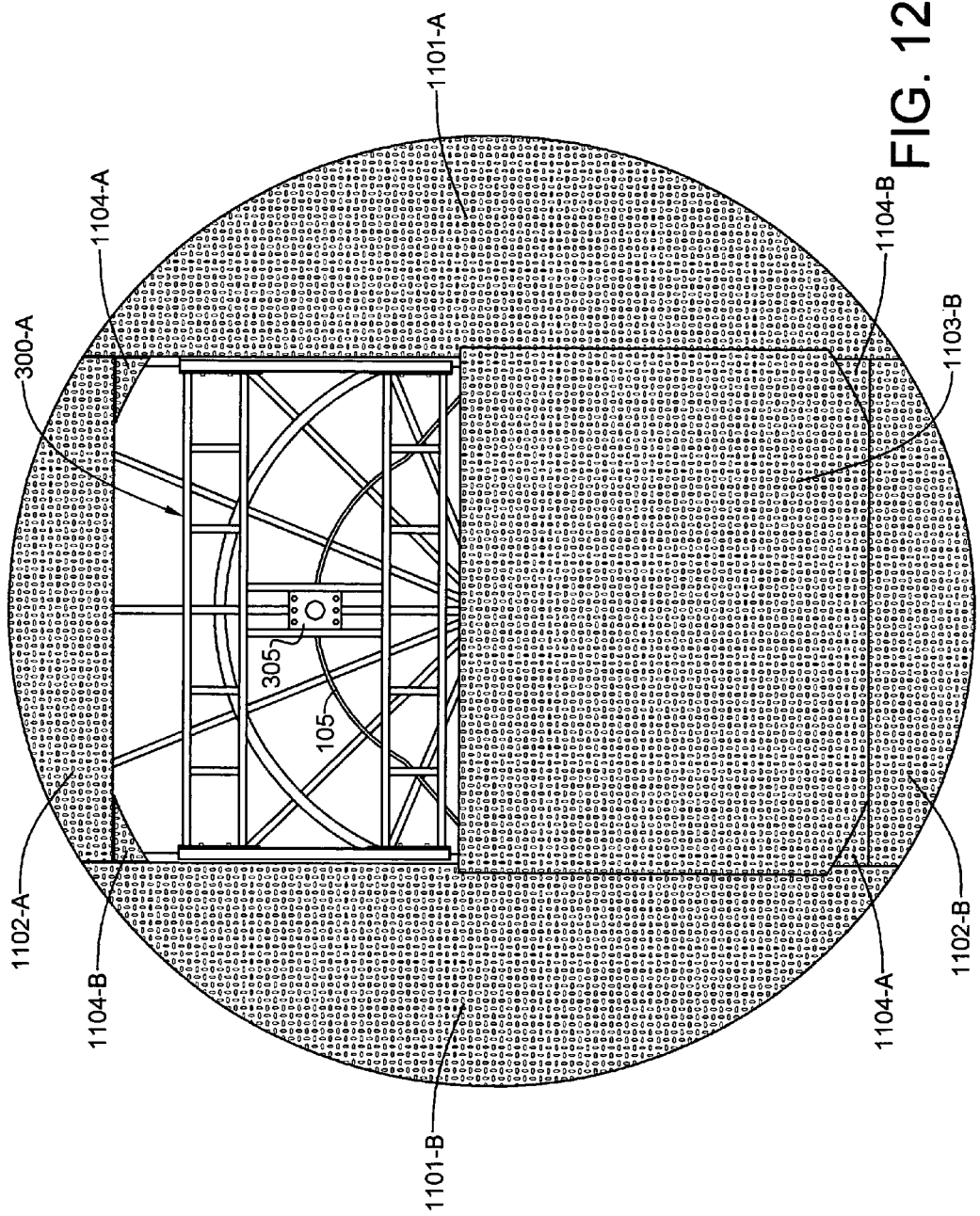
FIG. 12 is a top plan view of the assembly of FIG. 11 after it has been rotated 90 degrees.

Referring now to FIG. 12, the carriage 200 has been rotated, with the subframe 100 remaining stationary. As the carriage 200 has rotated, the cam follower and pivot assembly 305 has tracked the rail cam 105, resulting in movement of the movable platform 300 toward the center of the carriage 200.

For this particular embodiment of the invention, each movable platform moves a total of 18 inches toward the center. Thus, two vehicles resting on the two platforms will be 36 inches closer together within about 30 degrees of carriage rotation. It will be noted that each of the triangularly-shaped panels 1104-A and 1104-B have rotated to fill the gaps in the outer corners of panels 1103-A (not yet shown) and 1103-B.

Figure 13:
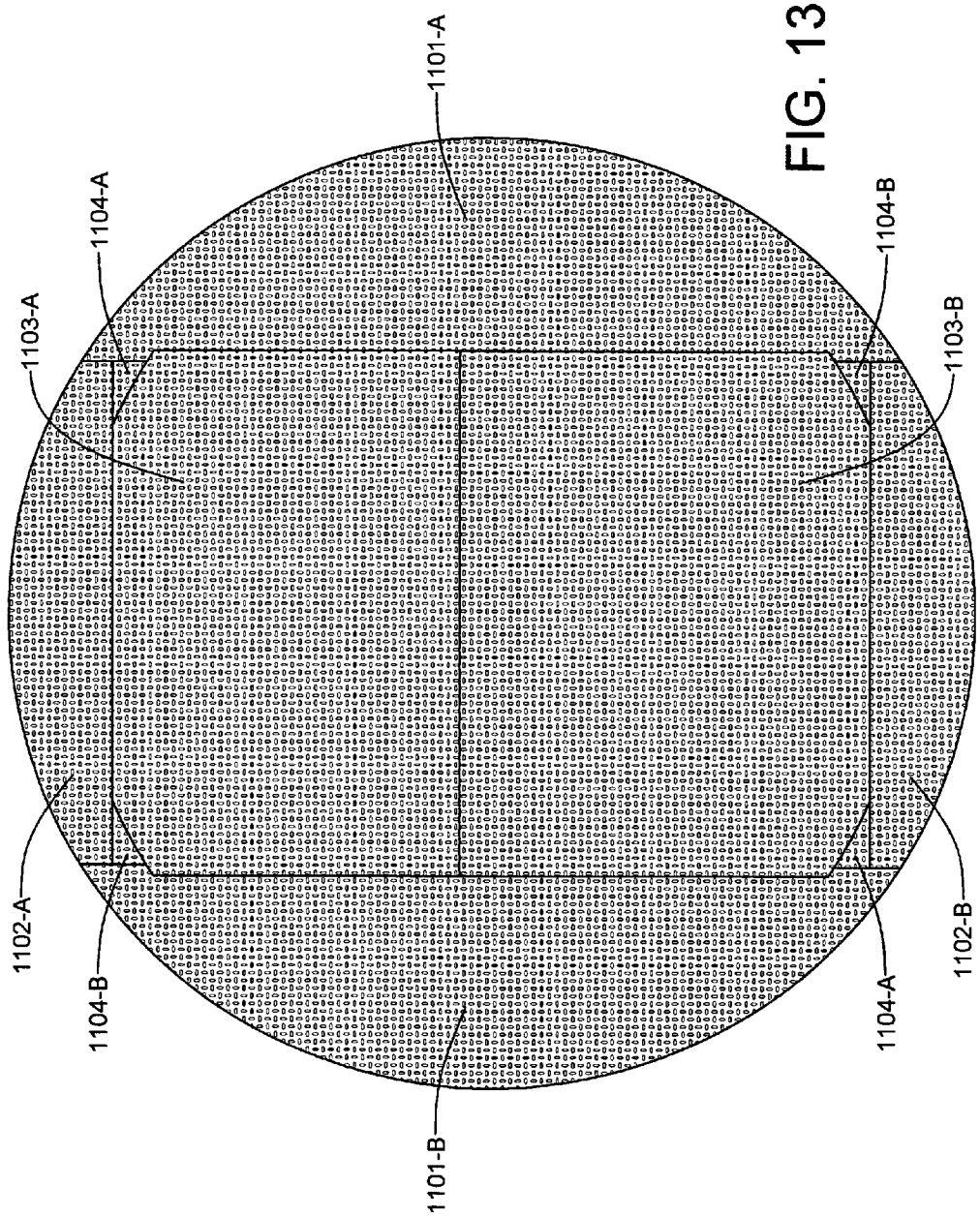
FIG. 13 is a top plan view of the assembly of FIG. 12 at the same rotational position, but with another metal decking plae installed.

Referring now to FIG. 13, panel 1103-A has been installed on the left movable platform 300-A, which is now positioned above the right movable platform 300-A. When 180 degrees of rotation is complete, the movable platforms 300 exchange places, but will return to the original spaced-apart relationship of FIG. 11. It will be noted that panel 1103-A has slid beneath panel 1103-B. To avoid a collision of the two panels, small ramps are installed on the carriage beneath the centermost edge of panel 1103-B so that it will curl slightly upward, thereby permitting panel 1103-A to travel beneath it.

Figure 14:
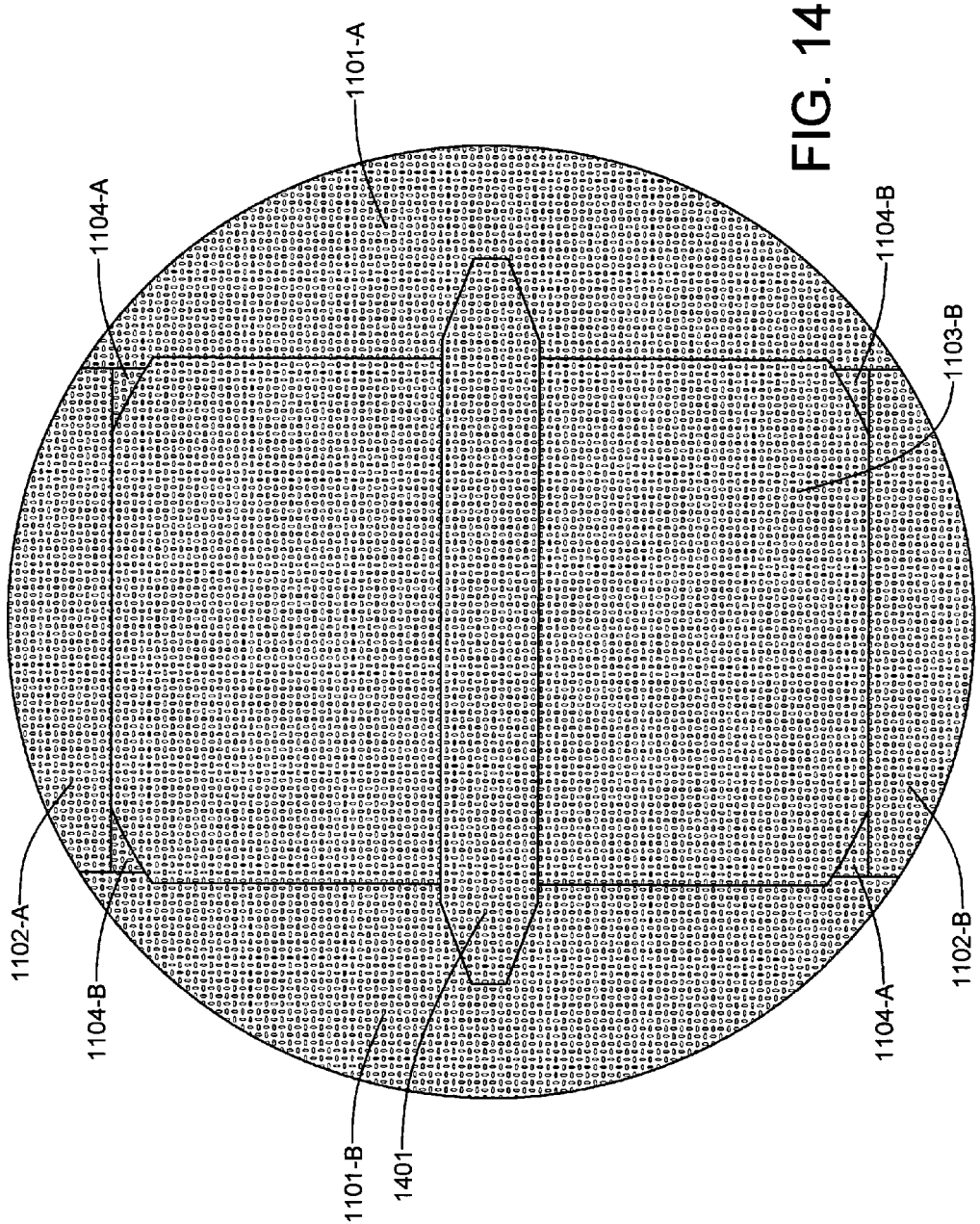
FIG. 14 is a top plan view of the assembly of FIG. 13 at the same rotational position, but with a final central metal decking plate installed thereon.

Referring now to FIG. 14, a central panel 1401, which bridges the movable platforms 300 and the panels (1103-A and 1103-B), has been anchored at its ends to the carriage 200 with screws (not shown). The central panel 1401 covers the gap between panels 1103-A and 1103-B when platforms 300-A and 300-B are in a maximum spaced-apart relationship.

For a preferred embodiment of the invention, the turntable is fabricated so that the center is about two inches higher in elevation than the edges, so that water will drain from the upper surfaces of the sheet metal decking panels to the edges of the turntable.

Although only a single embodiment of the invention has been heretofore described, it will be obvious to those having ordinary skill in the art that changes and modifications may be made thereto without departing from the scope and the spirit of the invention as hereinafter claimed.

What is claimed is:

1. A garage-installable, dual-vehicle turntable comprising:
   a subframe having a vertical central pivot axis, and a dual-lobe rail cam that is quadrilaterally symmetrical about a pair of perpendicular planes passing through said central pivot axis;
   a carriage rotatably mounted atop said subframe, said subframe and said carriage having associated therewith both a circular track with a center coincident said central pivot axis, and a plurality of rollers which are angularly spaced about said central pivot axis and in continual contact with said track, said rollers serving to reduce friction as said carriage rotates on said subframe about said central pivot axis; and
   a pair of platforms mounted on the carriage, each of said platforms sized to support a single vehicle and having a cam follower that tracks the rail cam as the carriage rotates, said platforms being linearly and simultaneously movable back and forth in opposite directions, with respect to one another, by the interaction of the cam followers with the rail cam as the carriage rotates about the central pivot axis, from a maximum spaced-apart relationship that is optimal for driving a vehicle in a forward direction through a garage opening onto each of the platforms, to a minimum spaced-apart relationship that enables rotation of the vehicle-laden carriage within a narrow garage through an angle of 180 degrees, and back to the maximum spaced-apart relationship that is optimal for driving a vehicle in a forward direction off each of the platforms through the garage opening.

2. The turntable of claim 1, wherein movement of said platforms from said maximum spaced-apart relationship to said minimum spaced-apart relationship and from said minimum spaced-apart relationship to said maximum spaced-apart relationship is accomplished within about 30 degrees of carriage rotation.

3. The turntable of claim 1, wherein said carriage and each of said platforms is fabricated from a framework of interconnecting beams covered with metal plate sheeting.

4. The turntable of claim 3, wherein the metal plate sheeting on each platform overhangs the inner edges of its associated framework, such that when said platforms move from said maximum spaced-apart relationship to said minimum spaced-apart relationship, the metal plate sheeting overhanging the inner edge of one platform moves beneath the metal plate sheeting overhanging the inner edge of the other platform.

5. The turntable of claim 3, wherein the metal plate sheeting on each platform overhangs the outer edges of its associated framework, such that when said platforms move from said minimum spaced-apart relationship to said maximum spaced-apart relationship, the metal plate sheeting overhanging the outer edge of each platform and a portion of the metal plate sheeting on the carriage that is adjacent an outer edge thereof overlap.

6. The turntable of claim 1, wherein two rows of linearly-mounted rollers provide reduced-friction movement of each platform on the carriage.

7. The turntable of claim 1, wherein said central pivot is a tapered roller bearing assembly.

8. The turntable of claim 1, which has a total height of less than four inches.

9. The turntable of claim 1, wherein said rail cam, from a plan view perspective, is both bilaterally and quadrilaterally symmetrical.

10. A garage-installable, dual-vehicle turntable comprising:
    a subframe having a central pivot axis, a circular track and a dual-lobe rail cam that, from a plan view perspective, is generally bilaterally-symmetrical;
    a carriage rotatably coupled to the subframe about the central pivot axis, said carriage having an outer periphery and a plurality of rollers mounted thereto, which are angularly spaced about said central pivot adjacent said outer periphery, each roller having a rotational axis which intersects said central pivot axis, said rollers riding on said circular track; and
    a pair of platforms mounted on the carriage, each of said platforms sized to support a single vehicle and having a cam follower that tracks the rail cam as the carriage rotates, said platforms being linearly and simultaneously movable back and forth in opposite directions, with respect to one another, by the interaction of the cam followers with the rail cam as the carriage rotates about the central pivot axis, from a maximum spaced-apart relationship that is optimal for driving a vehicle in a forward direction through a garage opening onto each of the platforms, to a minimum spaced-apart relationship that enables rotation of the vehicle-laden carriage within a narrow garage through an angle of 180 degrees, and back to the maximum spaced-apart relationship that is optimal for driving a vehicle in a forward direction off each of the platforms through the garage opening.

11. The turntable of claim 10, wherein movement of said platforms from said maximum spaced-apart relationship to said minimum spaced-apart relationship and from said minimum spaced-apart relationship to said maximum spaced-apart relationship is accomplished within about 30 degrees of carriage rotation.

12. The turntable of claim 10, wherein said carriage and each of said platforms is fabricated from a framework of interconnecting beams covered with metal plate sheeting.

13. The turntable of claim 12, wherein the metal plate sheeting on each platform overhangs the outer edges of its associated framework, such that when said platforms move from said minimum spaced-apart relationship to said maximum spaced-apart relationship, the metal plate sheeting overhanging the outer edge of each platform and a portion of the metal plate sheeting on the carriage that is adjacent an outer edge thereof overlap.

14. The turntable of claim 12, wherein the metal plate sheeting on each platform overhangs the inner edges of its associated framework, such that when said platforms move from said maximum spaced-apart relationship to said minimum spaced-apart relationship, the metal plate sheeting overhanging the inner edge of one platform moves beneath the metal plate sheeting overhanging the inner edge of the other platform.

15. The turntable of claim 10, wherein two rows of linearly-mounted rollers provide reduced-friction movement of each platform on the carriage.

16. The turntable of claim 10, wherein said central pivot is a tapered roller bearing assembly.

17. The turntable of claim 10, which has a total height of less than four inches.

18. The turntable of claim 10, wherein said bilaterally-symmetrical, dual-lobe rail cam is also quadrilaterally symmetrical.

* * * * *